(12) United States Patent
Harata et al.

(10) Patent No.: US 10,800,660 B2
(45) Date of Patent: *Oct. 13, 2020

(54) METHOD FOR PRODUCING SILICON MATERIAL

(71) Applicant: KABUSHIKI KAISHA TOYOTA JIDOSHOKKI, Kariya-shi, Aichi (JP)

(72) Inventors: Masanori Harata, Kariya (JP); Takashi Mohri, Kariya (JP); Nobuhiro Goda, Kariya (JP); Yasuhiro Yamaguchi, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 5 days.

This patent is subject to a terminal disclaimer.

(21) Appl. No.: 15/761,166

(22) PCT Filed: Oct. 27, 2016

(86) PCT No.: PCT/JP2016/004728
§ 371 (c)(1),
(2) Date: Mar. 19, 2018

(87) PCT Pub. No.: WO2017/073063
PCT Pub. Date: May 4, 2017

(65) Prior Publication Data
US 2018/0265366 A1  Sep. 20, 2018

(30) Foreign Application Priority Data

Oct. 29, 2015 (JP) ................................. 2015-212747

(51) Int. Cl.
*C01B 33/021* (2006.01)
*C01B 33/06* (2006.01)
(Continued)

(52) U.S. Cl.
CPC ............ *C01B 33/021* (2013.01); *C01B 33/06* (2013.01); *H01M 4/134* (2013.01); *H01M 4/366* (2013.01);
(Continued)

(58) Field of Classification Search
CPC ........ C01B 33/00; C01B 33/021; H01M 4/38; H01M 4/36; H01M 4/134; H01M 4/622; H01M 4/366
See application file for complete search history.

(56) References Cited

U.S. PATENT DOCUMENTS

2011/0318250 A1* 12/2011 Kaner .................... B82Y 30/00
423/344
2015/0307362 A1  10/2015 Sugiyama et al.

FOREIGN PATENT DOCUMENTS

JP  2011-090806 A  5/2011
JP  2015-179593 A  10/2015
(Continued)

OTHER PUBLICATIONS

JP2014123537, Sugiyama et al, see machine translation for english, (Year: 2014).*
(Continued)

*Primary Examiner* — Smita S Patel
(74) *Attorney, Agent, or Firm* — Sughrue Mion, PLLC

(57) ABSTRACT

A method for producing a silicon material, the method including:
a step of heating $CaSi_2$ powder in a range of 400 to 1000° C.;
a step of reacting acid with the $CaSi_2$ powder having been subjected to the step of heating $CaSi_2$ powder in a range of 400 to 1000° C., to obtain a layered silicon compound; and
(Continued)

a step of heating the layered silicon compound at not less than 300° C.

3 Claims, 3 Drawing Sheets

(51) Int. Cl.
    *H01M 4/134*     (2010.01)
    *H01M 4/36*     (2006.01)
    *H01M 4/38*     (2006.01)
    *H01M 4/62*     (2006.01)
    *H01M 10/0525*     (2010.01)
    *H01M 4/02*     (2006.01)

(52) U.S. Cl.
    CPC ............ *H01M 4/386* (2013.01); *H01M 4/622* (2013.01); *H01M 10/0525* (2013.01); *H01M 2004/027* (2013.01)

(56) References Cited

FOREIGN PATENT DOCUMENTS

| | | |
|---|---|---|
| JP | 2016-041644 A | 3/2016 |
| WO | 2014/080608 A1 | 5/2014 |

OTHER PUBLICATIONS

H. D. Fuchs et al., "Porous silicon and siloxene: Vibrational and structural properties", Physical Review B, Sep. 15, 1993, pp. 8172-8189, vol. 48, No. 11.

International Search Report of PCT/JP2016/004728 dated Dec. 27, 2016 [PCT/ISA/210].

Written Opinion of PCT/JP2016/004728 dated Dec. 27, 2016 [PCT/ISA/237].

* cited by examiner

METHOD FOR PRODUCING SILICON MATERIAL

CROSS REFERENCE TO RELATED APPLICATIONS

This application is a National Stage of International Application No. PCT/JP2016/004728, filed Oct. 27, 2016, claiming priority based on Japanese Patent Application No. 2015-212747, filed Oct. 29, 2015.

TECHNICAL FIELD

The present disclosure relates to a method for producing a silicon material.

BACKGROUND ART

Silicon materials are known to be used as a constituent of a semiconductor, a solar battery, a secondary battery, or the like, and studies on silicon materials are actively conducted in recent years.

For example, Non-Patent Literature 1 describes synthesizing layered polysilane by reacting $CaSi_2$ with acid.

Patent Literature 1 describes synthesizing layered polysilane by reacting $CaSi_2$ with acid, and describes that a lithium ion secondary battery having the layered polysilane as an active material exhibits a suitable capacity.

Patent Literature 2 describes: synthesizing a layered silicon compound of which main component is layered polysilane in which Ca is removed by reacting $CaSi_2$ with acid; and heating the layered silicon compound at not less than 300° C. to produce a silicon material from which hydrogen is removed, and also describes that a lithium ion secondary battery having the silicon material as an active material exhibits a suitable capacity retention rate.

Patent Literature 3 describes: synthesizing a layered silicon compound of which main component is layered polysilane in which Ca is removed by reacting $CaSi_2$ with acid; heating the layered silicon compound to produce a silicon material (nano silicon aggregated particles) from which hydrogen is removed; and producing a negative electrode active material by coating the silicon material with a carbon layer, and also describes that a lithium ion secondary battery having the negative electrode active material exhibits suitable battery characteristics.

CITATION LIST

Patent Literature

Patent Literature 1: JP2011090806 (A)
Patent Literature 2: WO2014/080608
Patent Literature 3: JP2015-179593 (A)

Non-Patent Literature

Non-Patent Literature 1: PHYSICAL REVIEW B, Volume 48, 1993, p. 8172-p. 8189

SUMMARY

Technical Problem

However, demand for performance of power storage devices such as a lithium ion secondary battery is increasing, and in particular, a new material that serves as an excellent active material and provision of a production method therefor are desired.

The present disclosure was made in light of such circumstances, and an object of the present disclosure is to provide a new production method for a silicon material that serves as an active material.

Solution to Problem

Meanwhile, in order to improve the yield, $CaSi_2$ described in each of Patent Literature 1 to 3 and Non-Patent Literature 1 is usually used in a powdery state. Here, powdery $CaSi_2$ is usually produced in the following procedure. First, Ca and Si are heated to produce a molten metal in a liquid state. Next, the molten metal is cooled to obtain massive $CaSi_2$. Then, the massive $CaSi_2$ is ground by a grinder to obtain powdery $CaSi_2$.

The present inventors assumed that the grinding mentioned above gives some damage to $CaSi_2$. Thus, the present inventors actually analyzed $CaSi_2$ powder that has been ground, and the present inventors found that misorientation, i.e., distortion, occurred in the same crystal particle of $CaSi_2$.

As a result of further study conducted by the present inventors, the above-mentioned distortion was found to be reduced by heating $CaSi_2$ powder at a specific temperature. In addition, the present inventors found that a silicon material produced via a layered silicon compound by use of the $CaSi_2$ powder having reduced distortion suitably functions as an active material. On the basis of these findings, the present inventors completed the present disclosure.

That is, a method for producing a silicon material of the present disclosure includes:
a step of heating $CaSi_2$ powder in a range of 400 to 1000° C.;
a step of reacting acid with the $CaSi_2$ powder having been subjected to the step of heating $CaSi_2$ powder in a range of 400 to 1000° C., to obtain a layered silicon compound; and
a step of heating the layered silicon compound at not less than 300° C.

Advantageous Effects

A silicon material that serves as a suitable active material is provided by the method for producing a silicon material of the present disclosure.

DESCRIPTION OF EMBODIMENTS

Figure 1:
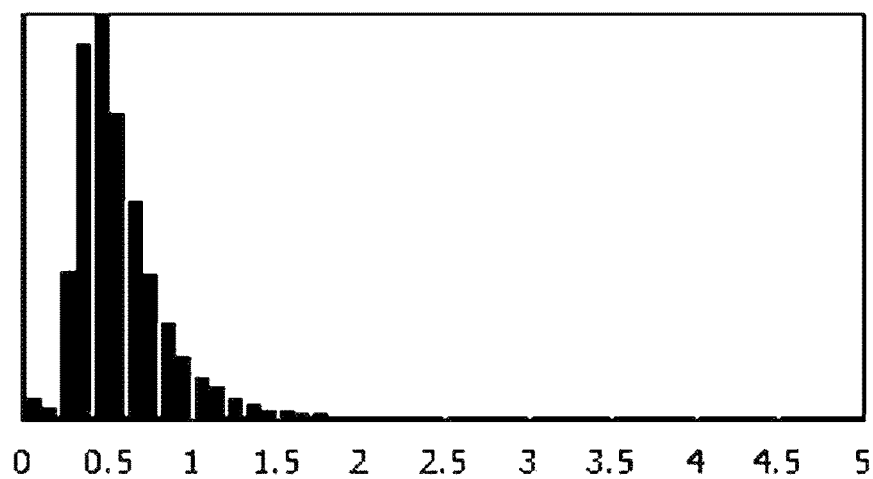
FIG. 1 shows frequency distribution in which the X axis represents the mean value of local misorientation and the Y axis represents the frequency with respect to $CaSi_2$ powder of Example 1, the local misorientation being calculated between each measurement point and each of all points adjacent thereto.
Figure 2:
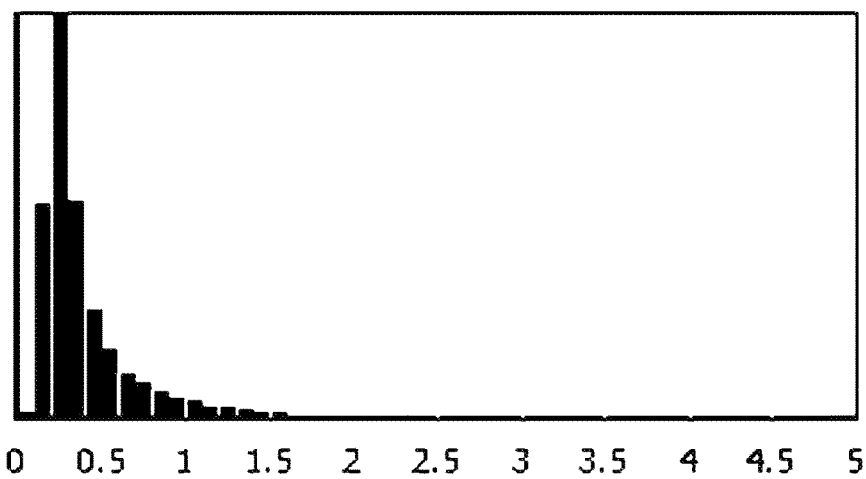
FIG. 2 shows frequency distribution in which the X axis represents the mean value of local misorientation and the Y axis represents the frequency with respect to $CaSi_2$ powder of Example 2, the local misorientation being calculated between each measurement point and each of all points adjacent thereto.
Figure 3:
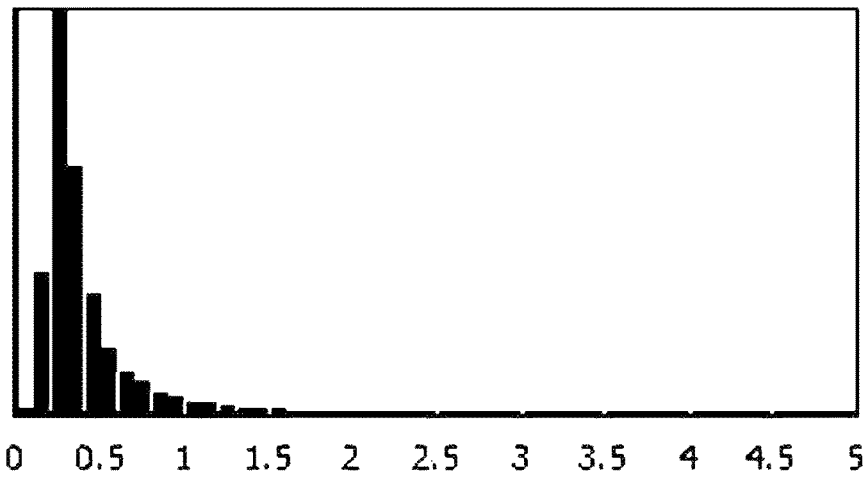
FIG. 3 shows frequency distribution in which the X axis represents the mean value of local misorientation and the Y axis represents the frequency with respect to $CaSi_2$ powder of Example 3, the local misorientation being calculated between each measurement point and each of all points adjacent thereto.
Figure 4:
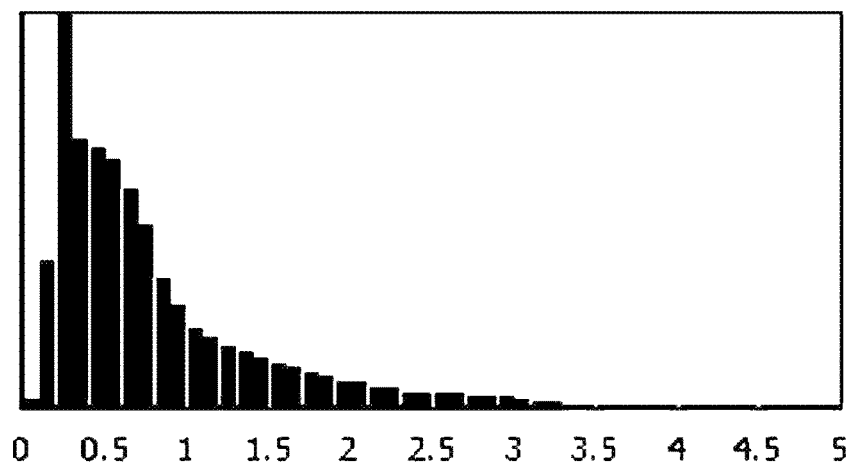
FIG. 4 shows frequency distribution in which the X axis represents the mean value of local misorientation and the Y axis represents the frequency with respect to $CaSi_2$ powder of Comparative Example 1, the local misorientation being calculated between each measurement point and each of all points adjacent thereto.
Figure 5:
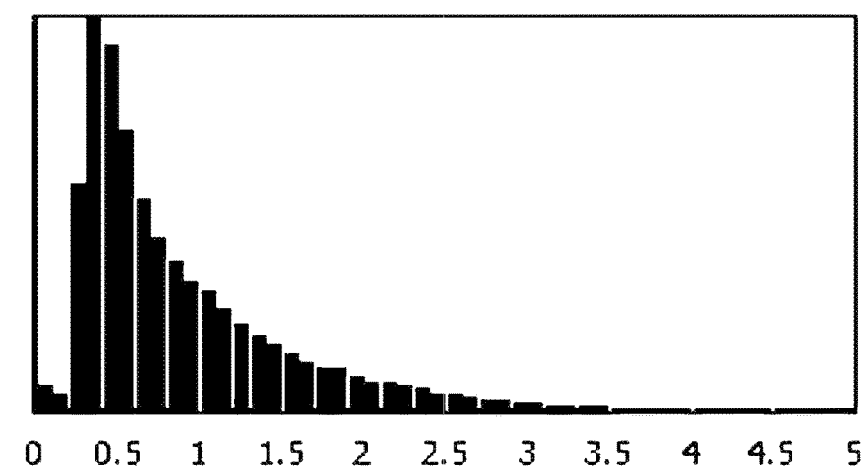
FIG. 5 shows frequency distribution in which the X axis represents the mean value of local misorientation and the Y axis represents the frequency with respect to $CaSi_2$ powder of Comparative Example 2, the local misorientation being calculated between each measurement point and each of all points adjacent thereto.

The following describes embodiments of the present disclosure. Unless mentioned otherwise in particular, a numerical value range of "x to y" described in the present specification includes, in a range thereof, a lower limit "x" and an upper limit "y". A numerical value range is formed by arbitrarily combining such upper limit values, lower limit values, and numerical values described in Examples. In addition, numerical values arbitrarily selected within a numerical value range are used as upper limit and lower limit numerical values.

A method for producing a silicon material of the present disclosure includes:

a step of heating $CaSi_2$ powder in a range of 400 to 1000° C.;

a step of reacting acid with the $CaSi_2$ powder having been subjected to the step of heating $CaSi_2$ powder in a range of 400 to 1000° C., to obtain a layered silicon compound; and a step of heating the layered silicon compound at not less than 300° C.

Hereinafter, a silicon material produced by the method for producing a silicon material of the present disclosure is also referred to as the "silicon material of the present disclosure", and $CaSi_2$ powder having been subjected to the step of heating $CaSi_2$ powder in a range of 400 to 1000° C. is also referred to as the "$CaSi_2$ powder of the present disclosure".

First, the step of heating $CaSi_2$ powder in a range of 400 to 1000° C. (hereinafter, also referred to as "$CaSi_2$ powder heating step") is described. Here, $CaSi_2$ powder used here is obtained by a production method such as grinding massive $CaSi_2$ by means of a grinder, and has distortion in the crystals thereof.

As $CaSi_2$ powder, commercially available $CaSi_2$ powder may be employed or $CaSi_2$ powder produced by a known method may be employed. As the grinder which grinds massive $CaSi_2$, a general grinder may be used. For example, a pin mill, a hammer mill, a ball mill, a disk mill, a roller mill, or a jaw crusher is preferably used, and further, a jet mill may be used in combination.

The shape of $CaSi_2$ powder is not limited in particular. Examples of the particle size distribution of $CaSi_2$ powder measured by a general laser diffraction type particle size distribution measuring device include the mean particle diameter (D50) being in a range of 0.1 to 10000 μm, in a range of 1 to 1000 μm, in a range of 5 to 500 μm, in a range of 1 to 30 μm, and in a range of 1 to 10 μm. Preferably, the particle size distribution of $CaSi_2$ powder is in a sharp distribution state. $CaSi_2$ powder having passed through a sieve having an aperture of 5000 μm, 1000 μm, 500 μm, 250 μm, or the like may be used. The particle diameter of $CaSi_2$ powder influences the particle diameter of the silicon material, and thus, for example, when $CaSi_2$ powder of which mean particle diameter is in a range of 1 to 10 μm is employed, a grinding step for the silicon material may not be required.

Without departing from the gist of the present disclosure, $CaSi_2$ may contain impurities. Examples of assumable impurities include elements contained in a raw material, elements derived from a production step, crystalline silicon having a relatively large crystal size, $Ca_{14}Si_{19}$, and the like.

For massive $CaSi_2$ or $CaSi_2$ powder, a step of removing or reducing impurities may be added. For example, if a mixture obtained by adding Ca to $CaSi_2$ that contains crystalline silicon is heated to obtain a molten metal, crystalline silicon and Ca are caused to react in the molten metal to synthesize $CaSi_2$, and then the molten metal is cooled, $CaSi_2$ having a reduced amount of crystalline silicon is produced.

In the $CaSi_2$ powder heating step, the heating temperature of $CaSi_2$ powder is in a range of 400 to 1000° C. If the heating temperature is low, insufficient reduction of distortion is caused in some cases. Since the melting point of $CaSi_2$ is around 1020° C., a heating temperature exceeding 1020° C. causes $CaSi_2$ powder to be in a liquid state, and thus, is not appropriate. The heating temperature is preferably in a range of 450 to 950° C., more preferably in a range of 500 to 900° C., further preferably in a range of 700 to 900° C.

As a heater, a general heating oven may be used. The heating time is determined as appropriate in accordance with the heating temperature and the reduction degree of distortion in $CaSi_2$. Examples of the heating time include 1 to 20 hours and 2 to 15 hours. The heating is preferably conducted in an atmosphere of an inert gas. Examples of the inert gas include rare gases such as helium and argon.

Compared with ground $CaSi_2$ powder, the $CaSi_2$ powder of the present disclosure has reduced distortion in $CaSi_2$ crystals. In order to confirm the distortion, with respect to the entirety of an SEM image in which $CaSi_2$ powder is observed by a scanning electron microscope (hereinafter, abbreviated as SEM), misorientation in each $CaSi_2$ crystal particle is calculated by use of an EBSD (Electron Back Scatter Diffraction Patterns) method. More specifically, misorientation (the unit is "degree") between the pixels indicating the image of a measurement point in a $CaSi_2$ crystal particle, and the pixels indicating each of all measurement points adjacent thereto in the same $CaSi_2$ crystal particle is calculated, and the mean value thereof is calculated. By performing this operation on the entirety of the SEM image, the mean local misorientation of the sample is calculated.

The $CaSi_2$ powder of the present disclosure preferably has a smaller mean local misorientation of the $CaSi_2$ crystals.

A specific mean local misorientation is preferably in a range of 0 to 0.7 degrees, more preferably in a range of 0 to 0.5 degrees. If a lower limit value of the mean local misorientation is to be shown, examples of such a lower limit value include 0.1 degrees, 0.2 degrees, and 0.3 degrees.

The $CaSi_2$ powder heating step is also understood as a method for producing $CaSi_2$ powder having reduced distortion in crystals thereof, wherein $CaSi_2$ powder is heated in a range of 400 to 1000° C.

Next, a step of reacting acid with the $CaSi_2$ powder having been subjected to the heating step, to obtain a layered silicon compound (hereinafter, also referred to as "step of obtaining a layered silicon compound") is described. In this step, in $CaSi_2$ in the layered crystal structure, Si forms a Si—H bond while Ca is substituted with H of the acid. The layered silicon compound is in a layered form because the basic backbone of a Si layer by $CaSi_2$ which is a raw material is maintained.

Examples of the acid include hydrofluoric acid, hydrochloric acid, hydrobromic acid, hydroiodic acid, sulfuric acid, nitric acid, phosphoric acid, formic acid, acetic acid, methanesulfonic acid, tetrafluoroboric acid, hexafluorophosphoric acid, hexafluoroarsenic acid, fluoroantimonic acid, hexafluorosilicic acid, hexafluorogermanic acid, hexafluorostannic (IV) acid, trifluoroacetic acid, hexafluorotitanic acid, hexafluorozirconic acid, trifluoromethanesulfonic acid, and fluorosulfonic acid. These acids may be used singly or in combination.

In particular, use of an acid that causes a fluorine anion as the acid is occasionally preferred. By employing such acid, a Si—O bond and a bond between Si and anion of other acid (for example, Si—Cl bond in the case of hydrochloric acid) that possibly occur in the layered silicon compound are reduced. If a Si—O bond or a Si—Cl bond exists in the layered silicon compound, the Si—O bond or the Si—Cl bond occasionally exists in the silicon material even after the next step. In a lithium ion secondary battery in which a silicon material having a Si—O bond or a Si—Cl bond is used as a negative electrode active material, the Si—O bond or the Si—Cl bond is assumed to inhibit movement of lithium ions.

In the step of obtaining a layered silicon compound, the acid may be used in such an amount that supplies protons of not less than 2 equivalents to $CaSi_2$. While the step may be conducted in the absence of a solvent, use of water as a solvent is preferred from the view point of separation of the target substance and removal of a secondary product such as $CaCl_2$. As the reaction condition of the step, a reduced pressure condition such as in vacuum, or an inert gas atmosphere condition is preferred, and a temperature condition of not higher than room temperature such as in an ice bath is preferred. The reaction time of the step is appropriately set.

The chemical reaction of the step of obtaining a layered silicon compound in the case of using hydrochloric acid as the acid is represented by the following ideal reaction formula.

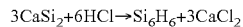

In the above reaction formula, $Si_6H_6$ corresponds to an ideal layered silicon compound.

The step of obtaining a layered silicon compound is preferably conducted in the presence of water, and $Si_6H_6$ reacts with water. Thus, usually, the layered silicon compound is rarely obtained as compounds of $Si_6H_6$ only, and the layered silicon compound contains oxygen or an element derived from acid.

Following the step of obtaining a layered silicon compound, preferably, a filtering step of collecting the layered silicon compound by filtration, a washing step of washing the layered silicon compound, and a drying step of drying the layered silicon compound are conducted if necessary.

Next, a step of heating the layered silicon compound at not less than 300° C. (hereinafter, also simply referred to as "heating step") is described. In the step, the layered silicon compound is heated at not less than 300° C. to make hydrogen, water, or the like leave, to obtain a silicon material. An ideal reaction formula of the chemical reaction of this step is as follows.

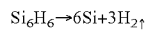

Since the layered silicon compound that is actually used in the heating step contains oxygen or an element derived from acid, and further contains inevitable impurities, the silicon material that is actually obtained also contains oxygen or an element derived from acid, and further contains inevitable impurities.

Preferably, the heating step is conducted in a non-oxidative atmosphere containing less oxygen than under a normal atmosphere. Examples of the non-oxidative atmosphere include a reduced pressure atmosphere including vacuum, and an inert gas atmosphere. The heating temperature is preferably in a range of 350° C. to 1100° C., more preferably in a range of 400° C. to 1000° C. If the heating temperature is too low, removal of hydrogen is occasionally insufficient, whereas if the heating temperature is too high, the energy is wasted. The heating time is appropriately set in accordance with the heating temperature. Preferably, the heating time is determined while the amount of hydrogen coming off the reaction system is measured. By appropriately selecting the heating temperature and the heating time, the ratio between amorphous silicon and silicon crystallite contained in the silicon material to be produced, and the size of the silicon crystallite are adjusted. By appropriately selecting the heating temperature and the heating time, the form of the layer having a thickness in a nm order including amorphous silicon and silicon crystallite contained in the silicon material to be produced is adjusted.

As the size of the silicon crystallite, nm order is preferred. Specifically, the silicon crystallite size is preferably in a range of 0.5 nm to 300 nm, more preferably in a range of 1 nm to 100 nm, further preferably in a range of 1 nm to 50 nm, particularly preferably in a range of 1 nm to 10 nm. The silicon crystallite size is determined by subjecting the silicon material to an X-ray diffraction measurement (XRD measurement), and calculation by the Scherrer's equation using a half width of a diffraction peak in Si (111) plane of the obtained XRD chart. The silicon crystallite described here means the one observed as a broad peak in an XRD chart, and is distinguished from the already described crystalline silicon in the peak form thereof and the magnitude of the crystal size calculated from the peak.

By the heating step described above, a silicon material having a structure made up of a plurality of plate-like silicon bodies laminated in the thickness direction is obtained. This laminated structure is considered as being derived from the Si layer in $CaSi_2$ as a raw material and is confirmed by observation with a scanning electron microscope or the like. In consideration of using the silicon material as an active material of a lithium ion secondary battery, the plate-like silicon body has a thickness preferably in a range of 10 nm to 100 nm, more preferably in a range of 20 nm to 50 nm for efficient insertion and elimination reaction of lithium ion. The plate-like silicon body has a length in the longitudinal direction preferably in a range of 0.1 μm to 50 μm. Regarding the plate-like silicon body, (length in the longitudinal direction)/(thickness) preferably falls in a range of 2 to 1000.

The silicon material of the present disclosure may be ground or further classified. Regarding the particle diameter of the silicon material of the present disclosure measured by a general laser diffraction type particle size distribution measuring device, the mean particle diameter (D50) is preferably in a range of 1 to 30 μm, more preferably in a range of 2 to 20 μm, further preferably in a range of 3 to 10 μm.

The silicon material of the present disclosure is used for a negative electrode of power storage devices including secondary batteries such as a lithium ion secondary battery, an electric double layer capacitor, and a lithium ion capacitor. The silicon material of the present disclosure is also used, for example, as materials for CMOS, semiconductor memory, and solar battery, or as photocatalyst materials.

The lithium ion secondary battery of the present disclosure has the silicon material of the present disclosure as a negative electrode active material. Specifically, the lithium ion secondary battery of the present disclosure includes a positive electrode, a negative electrode having the silicon material of the present disclosure as a negative electrode active material, an electrolytic solution, and a separator.

The positive electrode has a current collector, and a positive electrode active material layer bound to the surface of the current collector.

The current collector refers to an electronic conductor that is chemically inert for continuously sending a flow of current to the electrode during discharging or charging of the lithium ion secondary battery. Examples of the current collector include at least one selected from silver, copper, gold, aluminum, tungsten, cobalt, zinc, nickel, iron, platinum, tin, indium, titanium, ruthenium, tantalum, chromium, or molybdenum, and metal materials such as stainless steel. The current collector may be coated with a known protective layer. One obtained by treating the surface of the current collector with a known method may be used as the current collector.

The current collector takes forms such as a foil, a sheet, a film, a line shape, a bar shape, and a mesh. Thus, as the current collector, for example, metal foils such as copper foil, nickel foil, aluminum foil, and stainless steel foil are suitably used. When the current collector is in the form of a foil, a sheet, or a film, the thickness thereof is preferably in a range of 1 µm to 100 µm.

The positive electrode active material layer includes a positive electrode active material, and, if necessary, a conductive additive and/or a binding agent.

Examples of the positive electrode active material include layered compounds that are $Li_aNi_bCo_cMn_dD_eO_f$ ($0.2 \le a \le 2$, $b+c+d+e=1$, $0 \le e < 1$; D is at least one element selected from Li, Fe, Cr, Cu, Zn, Ca, Mg, S, Si, Na, K, Al, Zr, Ti, P, Ga, Ge, V, Mo, Nb, W, or La; $1.7 \le f \le 3$) and $Li_2MnO_3$. Additional examples of the positive electrode active material include a spinel such as $LiMn_2O_4$, a solid solution formed by mixing a spinel and a layered compound, and polyanion-based compounds represented by $LiMPO_4$, $LiMVO_4$, $Li_2MSiO_4$ (where "M" is selected from at least one of Co, Ni, Mn, or Fe), or the like. Further additional examples of the positive electrode active material include tavorite-based compounds represented by $LiMPO_4F$ ("M" is a transition metal) such as $LiFePO_4F$ and borate-based compounds represented by $LiMBO_3$ ("M" is a transition metal) such as $LiFeBO_3$. Any metal oxide used as the positive electrode active material has a basic composition of the composition formulae described above, and those in which a metal element included in the basic composition is substituted with another metal element are also used as the positive electrode active material. In addition, as the positive electrode active material, a material for the positive electrode active material not containing lithium ion contributing to the charging and discharging, such as elemental substance sulfur, a compound that is a composite of sulfur and carbon, metal sulfides such as $TiS_2$, oxides such as $V_2O_5$ and $MnO_2$, polyaniline and anthraquinone and compounds containing such aromatics in the chemical structure, conjugate-based materials such as conjugate diacetic acid-based organic matters, and other known materials, may be used. Furthermore, a compound having a stable radical such as nitroxide, nitronyl nitroxide, galvinoxyl, and phenoxyl may be employed as the positive electrode active material. When a material for the positive electrode active material not containing lithium is used, an ion has to be added in advance to the positive electrode and/or the negative electrode using a known method. For adding the ion, metal or a compound containing the ion may be used.

The conductive additive is added for increasing conductivity of the electrode. Thus, the conductive additive is preferably added optionally when conductivity of the electrode is insufficient, and may not be added when conductivity of the electrode is sufficiently good. As the conductive additive, a fine electron conductor that is chemically inert may be used, and examples thereof include carbonaceous fine particles such as carbon black, graphite, vapor grown carbon fiber and various metal particles. Examples of the carbon black include acetylene black, Ketchen black (registered trademark), furnace black, and channel black. These conductive additives may be added to the active material layer singly or in combination of two or more types of these conductive additives.

The blending ratio of the conductive additive in the active material layer in mass ratio, i.e., active material:conductive additive, is preferably 1:0.005 to 1:0.5, more preferably 1:0.01 to 1:0.2, further preferably 1:0.03 to 1:0.1. The reason is that if the conductive additive is too little, efficient conducting paths are not formed, whereas if the conductive additive is too much, moldability of the active material layer deteriorates and energy density of the electrode becomes low.

The binding agent serves to adhere the active material, the conductive additive or the like to the surface of the current collector, and maintain the conductive network in the electrode. Examples of the binding agent include a fluorine-containing resin such as polyvinylidene fluoride, polytetrafluoroethylene, or fluororubber, a thermoplastic resin such as polypropylene or polyethylene, an imide-based resin such as polyimide or polyamide-imide, an alkoxysilyl group-containing resin, an acrylic resin such as poly(meth)acrylic acid, styrene-butadiene rubber (SBR), carboxymethyl cellulose, an alginate such as sodium alginate or ammonium alginate, a water-soluble cellulose ester crosslinked product, and starch-acrylic acid graft polymer. These binding agents may be employed singly or in plurality.

The blending ratio of the binding agent in the active material layer in mass ratio: active material:binding agent, is preferably 1:0.001 to 1:0.3, more preferably 1:0.005 to 1:0.2, further preferably 1:0.01 to 1:0.15. The reason is that if the binding agent is too little, the moldability of the electrode deteriorates, whereas if the binding agent is too much, energy density of the electrode becomes low.

The negative electrode has a current collector, and a negative electrode active material layer bound to the surface of the current collector. Regarding the current collector, those described for the positive electrode may be appropriately and suitably employed. The negative electrode active material layer includes a negative electrode active material, and, if necessary, a conductive additive and/or a binding agent.

As the negative electrode active material, the silicon material of the present disclosure may be used, only the silicon material of the present disclosure may be used, or a combination of the silicon material of the present disclosure and a known negative electrode active material may be used. The silicon material of the present disclosure covered with carbon may be used as the negative electrode active material.

Regarding the conductive additive and the binding agent to be used in the negative electrode, those described for the positive electrode may be appropriately and suitably employed in the blending ratio as described above.

In order to form the active material layer on the surface of the current collector, the active material may be applied on the surface of the current collector using a known conventional method such as a roll coating method, a die coating method, a dip coating method, a doctor blade method, a spray coating method, and a curtain coating method. Specifically, an active material, a solvent, and if necessary, a binding agent and/or a conductive additive are mixed to prepare a slurry. Examples of the solvent include N-methyl-2-pyrrolidone, methanol, methyl isobutyl ketone, and water. The slurry is applied on the surface of the current collector, and then dried. In order to increase the electrode density, compression may be performed after drying.

The electrolytic solution contains a nonaqueous solvent and an electrolyte dissolved in the nonaqueous solvent.

Examples of the nonaqueous solvent include cyclic esters, linear esters, and ethers. Examples of the cyclic esters include ethylene carbonate, propylene carbonate, butylene carbonate, gamma butyrolactone, vinylene carbonate, 2-methyl-gamma butyrolactone, acetyl-gamma butyrolactone, and gamma valerolactone. Examples of the linear esters include dimethyl carbonate, diethyl carbonate, dibutyl carbonate, dipropyl carbonate, ethylmethyl carbonate, propionic acid alkyl esters, malonic acid dialkyl esters, and acetic acid alkyl esters. Examples of the ethers include tetrahydrofuran, 2-methyltetrahydrofuran, 1,4-dioxane, 1,2-dimethoxyethane, 1,2-diethoxyethane, and 1,2-dibutoxyethane. As a nonaqueous solvent, compounds in which part or all of hydrogens in the chemical structure of the specific solvents are substituted by fluorine may be employed.

Examples of the electrolyte include lithium salts such as $LiClO_4$, $LiAsF_6$, $LiPF_6$, $LiBF_4$, $LiCF_3SO_3$, and $LiN(CF_3SO_2)_2$.

Examples of the electrolytic solution include solutions prepared by dissolving a lithium salt such as $LiClO_4$, $LiPF_6$, $LiBF_4$, or $LiCF_3SO_3$ in a nonaqueous solvent such as ethylene carbonate, dimethyl carbonate, propylene carbonate, or diethyl carbonate in a concentration of about 0.5 mol/L to 1.7 mol/L.

The separator is for separating the positive electrode and the negative electrode to allow passage of lithium ions while preventing short circuit due to a contact of both electrodes. Examples of the separator include porous materials, non-woven fabrics, and woven fabrics using one or more types of materials having electrical insulation property such as: synthetic resins such as polytetrafluoroethylene, polypropylene, polyethylene, polyimide, polyamide, polyaramide (aromatic polyamide), polyester, and polyacrylonitrile; polysaccharides such as cellulose and amylose; natural polymers such as fibroin, keratin, lignin, and suberin; and ceramics. In addition, the separator may have a multilayer structure.

Next, a method for producing a lithium ion secondary battery is described.

An electrode assembly is formed from the positive electrode, the negative electrode, and, if necessary, the separator interposed therebetween. The electrode assembly may be a laminated type obtained by stacking the positive electrode, the separator, and the negative electrode, or a wound type obtained by winding the positive electrode, the separator, and the negative electrode. The lithium ion secondary battery is preferably formed by respectively connecting, using current collecting leads or the like, the positive electrode current collector to a positive electrode external connection terminal and the negative electrode current collector to a negative electrode external connection terminal, and then adding the electrolytic solution to the electrode assembly. In addition, the lithium ion secondary battery of the present disclosure preferably executes charging and discharging in a voltage range suitable for the types of the active materials contained in the electrodes.

The form of the lithium ion secondary battery of the present disclosure is not limited in particular, and various forms such as a cylindrical type, a square type, a coin type, a laminated type, etc., are employed.

The lithium ion secondary battery of the present disclosure may be mounted on a vehicle. The vehicle may be a vehicle that uses, as all or a part of the source of power, electrical energy obtained from the lithium ion secondary battery, and examples thereof include electric vehicles and hybrid vehicles. When the lithium ion secondary battery is to be mounted on the vehicle, a plurality of the lithium ion secondary batteries may be connected in series to form an assembled battery. Other than the vehicles, examples of instruments on which the lithium ion secondary battery may be mounted include various home appliances, office instruments, and industrial instruments driven by a battery such as personal computers and portable communication devices. In addition, the lithium ion secondary battery of the present disclosure may be used as power storage devices and power smoothing devices for wind power generation, photovoltaic power generation, hydroelectric power generation, and other power systems, power supply sources for auxiliary machineries and/or power of ships, etc., power supply sources for auxiliary machineries and/or power of aircraft and spacecraft, etc., auxiliary power supply for vehicles that do not use electricity as a source of power, power supply for movable household robots, power supply for system backup, power supply for uninterruptible power supply devices, and power storage devices for temporarily storing power required for charging at charge stations for electric vehicles.

Although embodiments of the present disclosure have been described above, the present disclosure is not limited to the embodiments. Without departing from the gist of the present disclosure, the present disclosure is implemented in various modes with modifications and improvements, etc., that are made by a person skilled in the art.

EXAMPLES

In the following, the present disclosure is specifically described by presenting Examples, Comparative Examples and so on. The present disclosure is not limited to these Examples.

Example 1

$CaSi_2$ powder, a silicon material, and a lithium ion secondary battery of Example 1 were produced in the following manner.

Impurity Removing Step and Grinding Step

Crude $CaSi_2$ that contains crystalline silicon was prepared. 20 g of the crude $CaSi_2$ was placed in a carbon crucible. The carbon crucible was placed in a high-frequency induction heating device, and heated at 1150° C. in an argon gas atmosphere to melt the crude $CaSi_2$. 2 g of Ca was added to the molten crude $CaSi_2$, to produce a molten metal. The molten metal was poured into a mold and allowed to cool, and thus massive $CaSi_2$ was obtained. The massive $CaSi_2$ was ground by a pin mill, and caused to pass through a sieve having an aperture of 250 μm, to obtain $CaSi_2$ powder.

$CaSi_2$ Powder Heating Step

In an argon gas atmosphere, the above $CaSi_2$ powder was heated at 500° C. for 6 hours. The heated $CaSi_2$ powder was used as $CaSi_2$ powder of Example 1.

Step of Obtaining a Layered Silicon Compound

In 100 mL of a 35 mass % HCl aqueous solution in an ice bath, 5 g of the $CaSi_2$ powder of Example 1 was added in an argon gas atmosphere, and the mixture was stirred for 90 minutes. Dispersion of dark green powder into the reaction liquid was confirmed. The reaction liquid was filtered, and the residue was washed with distilled water and acetone, and further dried under a reduced pressure at room temperature for 12 hours, to obtain a layered silicon compound.

Heating Step (Step of Obtaining a Silicon Material)

The layered silicon compound was heated for 1 hour at 900° C. in an argon gas atmosphere, to obtain a silicon material of Example 1.

Step of Producing a Lithium Ion Secondary Battery

A slurry was prepared by mixing 45 parts by mass of the silicon material of Example 1 as the negative electrode active material, 40 parts by mass of graphite as the negative electrode active material, 10 parts by mass of polyamide imide as the binding agent, 5 parts by mass of acetylene black as the conductive additive, and an appropriate amount of N-methyl-2-pyrrolidone.

As the current collector, an electrolytic copper foil having a thickness of 20 μm was prepared. On the surface of the copper foil, the aforementioned slurry was applied in a film form by using a doctor blade. The copper foil on which the slurry was applied was dried for 20 minutes at 80° C. to remove N-methyl-2-pyrrolidone by volatilization, and thus a copper foil having a negative electrode active material layer formed on the surface of the foil was obtained. The copper foil was then compressed by using a roll pressing machine so that the thickness of the negative electrode active material layer was 20 μm to obtain a joined object. The obtained joined object was heated and dried for 2 hours under reduced pressure at 200° C. to obtain an electrode.

The electrode was cut to have a diameter of 11 mm to obtain an evaluation electrode. A metal lithium foil was cut to have a diameter of 13 mm to obtain a counter electrode. As the separator, a glass filter (Hoechst Celanese) and Celgard 2400 (Polypore International Inc.) which is a monolayer polypropylene were prepared. In a solvent prepared by mixing 50 parts by volume of ethylene carbonate, and 50 parts by volume of diethyl carbonate, $LiPF_6$ was dissolved in 1 mol/L to prepare an electrolytic solution. Two types of separators were sandwiched between the counter electrode and the evaluation electrode in the sequence of the counter electrode, the glass filter, Celgard 2400, and the evaluation electrode to obtain an electrode assembly. The electrode assembly was housed in a coin type battery case CR2032 (Hohsen Corp.), and further the electrolytic solution was injected, and thus a coin type battery was obtained. This was used as a lithium ion secondary battery of Example 1.

Example 2

$CaSi_2$ powder, a silicon material, and a lithium ion secondary battery of Example 2 were produced in the same method as Example 1 except that the heating temperature in the $CaSi_2$ powder heating step was 700° C.

Example 3

$CaSi_2$ powder, a silicon material, and a lithium ion secondary battery of Example 3 were produced in the same method as Example 1 except that the heating temperature in the $CaSi_2$ powder heating step was 900° C.

Example 4

$CaSi_2$ powder, a silicon material, and a lithium ion secondary battery of Example 4 were produced in the same method as Example 2 except that grinding by a jet mill was also conducted in addition to the grinding by a pin mill in the grinding step, to obtain $CaSi_2$ powder having a mean particle diameter of 2 μm.

Comparative Example 1

$CaSi_2$ powder ($CaSi_2$ powder obtained through the impurity removing step and the grinding step), a silicon material, and a lithium ion secondary battery of Comparative Example 1 were produced in the same method as Example 1 except that the $CaSi_2$ powder heating step was not conducted.

Comparative Example 2

$CaSi_2$ powder, a silicon material, and a lithium ion secondary battery of Comparative Example 2 were produced in the same method as Example 1 except that the heating temperature in the $CaSi_2$ powder heating step was 300° C.

Evaluation Example 1

The $CaSi_2$ powder of each of Examples 1 to 4 and Comparative Examples 1 and 2 was subjected to SEM/EBSD (JEOL Ltd./Oxford Instruments) which is an SEM having an EBSD detector mounted thereto, and the mean local misorientation was calculated by use of AZtec HKL (Oxford Instruments) as EBSD analytical software. The results are shown in Table 1. In addition, with respect to the $CaSi_2$ powder of each of Examples 1 to 3 and Comparative Examples 1 and 2, frequency distribution in which the X axis represents local misorientation calculated at each measurement point and the Y axis represents frequency is shown in a corresponding one of FIGS. 1 to 5.

TABLE 1

| | Heating temperature in $CaSi_2$ powder heating step | Mean local misorientation |
|---|---|---|
| Example 1 | 500° C. | 0.58 degrees |
| Example 2 | 700° C. | 0.46 degrees |
| Example 3 | 900° C. | 0.43 degrees |
| Example 4 | 700° C. | 0.47 degrees |
| Comparative Example 1 | — | 0.82 degrees |
| Comparative Example 2 | 300° C. | 0.90 degrees |

The results shown in Table 1 reveal that, in the $CaSi_2$ powder of the present disclosure having been subjected to the $CaSi_2$ powder heating step, the mean local misorientation is reduced. In addition, the mean local misorientation is revealed to have been suitably reduced when the temperature in the $CaSi_2$ powder heating step is higher.

Evaluation Example 2

With respect to the lithium ion secondary battery of each of Examples 1 to 4 and Comparative Examples 1 and 2, 50 cycles of a charging and discharging cycle were conducted.

Each charging and discharging cycle included discharging conducted at 0.25 C rate until the voltage of the evaluation electrode relative to the counter electrode was 0.01 V, and charging conducted at 0.25 C rate until the voltage of the evaluation electrode relative to the counter electrode was 1 V. The rate of the charge capacity in 50 cycles to the charge capacity of the first time was calculated as a capacity retention rate. The results are shown in Table 2 together with the results of the mean local misorientation of Evaluation Example 1. In Evaluation Example 2, occluding Li in the evaluation electrode is called discharging, and releasing Li from the evaluation electrode is called charging.

TABLE 2

|  | Mean local misorientation | Capacity retention rate |
|---|---|---|
| Example 1 | 0.58 degrees | 52% |
| Example 2 | 0.46 degrees | 63% |
| Example 3 | 0.43 degrees | 63% |
| Example 4 | 0.47 degrees | 63% |
| Comparative Example 1 | 0.82 degrees | 43% |
| Comparative Example 2 | 0.90 degrees | 41% |

Table 2 reveals that the capacity retention rate of the lithium ion secondary battery of each of Examples 1 to 4 is superior to the capacity retention rate of the lithium ion secondary battery of each of Comparative Examples 1 and 2. Table 2 also reveals that the smaller the mean local misorientation of the $CaSi_2$ powder as a raw material is, the higher the capacity retention rate of the lithium ion secondary battery having the silicon material of the product thereof is.

Before $CaSi_2$ becomes a silicon material, $CaSi_2$ is subjected to, at least, a step of reacting $CaSi_2$ powder with acid to obtain a layered silicon compound, and a step of heating the layered silicon compound at not less than 300° C. When $CaSi_2$ reacts with acid, Ca in $CaSi_2$ is substituted with hydrogen, thereby producing $Si_6H_6$. Thus, $CaSi_2$ crystals are considered to be no longer present at this stage. If a layered silicon compound that contains $Si_6H_6$ is heated at not less than 300° C. (in Examples and Comparative Examples, heating was conducted at 900° C.), hydrogen leaves, and a silicon material that contains amorphous silicon and silicon crystallite is generated. Then, the magnitude of the distortion, in $CaSi_2$ crystals as a raw material, which is influenced by the heating temperature about 400 to 1000° C. is usually not considerable to still influence the silicon material which undergoes at least two chemical structure changes and is produced under a heating condition of 900° C.

However, the results shown in Table 2 inevitably lead to a conclusion that the magnitude of the distortion in $CaSi_2$ crystals as a raw material had some influence on the physical properties of the silicon material.

What structural change or what change in the characteristics of the silicon material was caused by the magnitude of the distortion in $CaSi_2$ crystals was not clarified at present even through analysis and discussion by the present inventors rich in experience and knowledge. Therefore, the silicon material of the present disclosure is not, at present, distinguished from conventional silicon materials on the basis of the structure or the characteristics of the silicon material of the present disclosure. In other words, with respect to the silicon material of the present disclosure, circumstances, in which it is impossible or utterly impractical to define the silicon material of the present disclosure on the basis of its structure or characteristics, exist. Therefore, for identification of the silicon material of the present disclosure in order to distinguish the silicon material of the present disclosure from conventional silicon materials, the silicon material of the present disclosure has to be defined by the production method therefor.

Evaluation Example 3

Figure 6:
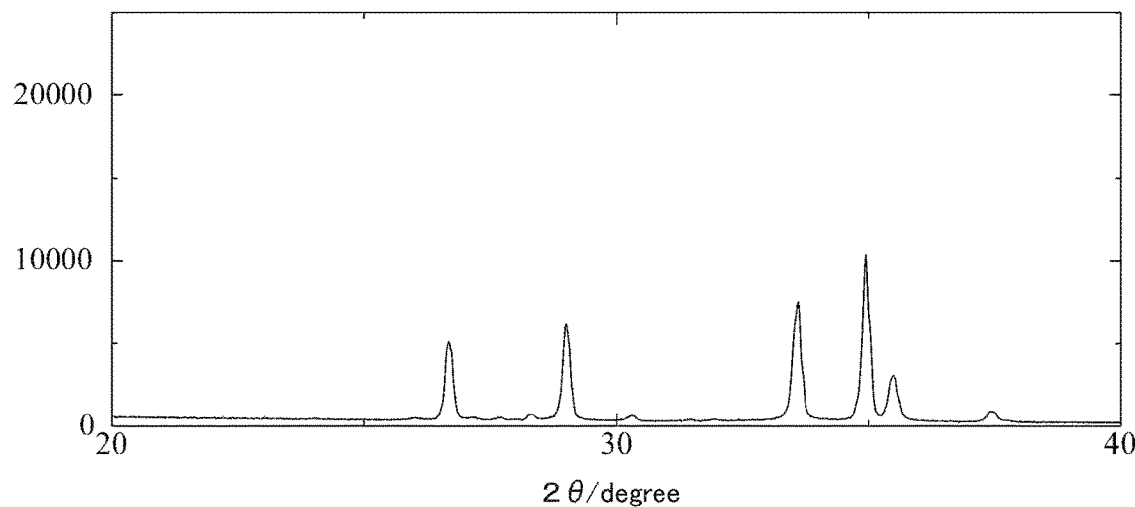
FIG. 6 is an X-ray diffraction chart of $CaSi_2$ powder of Example 2.
Figure 7:
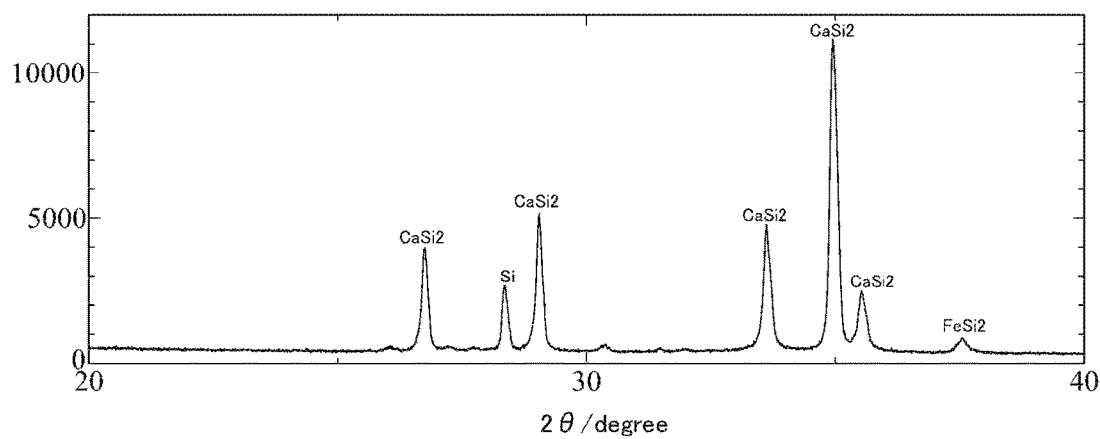
FIG. 7 is an X-ray diffraction chart of crude $CaSi_2$ as a raw material for $CaSi_2$ powder of Comparative Example 1.

The $CaSi_2$ powder of Example 2 and the crude $CaSi_2$ as a raw material of Comparative Example 1 were measured for X-ray diffraction by a powder X-ray diffraction device. FIG. 6 shows an obtained X-ray diffraction chart of the $CaSi_2$ powder of Example 2, and FIG. 7 shows an obtained X-ray diffraction chart of the crude $CaSi_2$ as a raw material of Comparative Example 1. In the X-ray diffraction chart in FIG. 6, a peak around 28°, which is derived from crystalline silicon and clearly observed in FIG. 7, is hardly observed. The amount of crystalline silicon contained in $CaSi_2$ was confirmed to be reduced due to addition of Ca in the impurity removing step.

The $CaSi_2$ powder of Example 4 and the $CaSi_2$ powder before being subjected to the $CaSi_2$ powder heating step in Example 4 were measured for X-ray diffraction by a powder X-ray diffraction device. When the X-ray diffraction charts of both were compared with each other, the X-ray diffraction chart of the $CaSi_2$ powder of Example 4 was confirmed to have a larger peak intensity. The fact that the X-ray diffraction chart of the $CaSi_2$ powder of Example 4 had a larger peak intensity is considered to reflect the result of correction of the distortion in crystals thereof through the $CaSi_2$ powder heating step.

The invention claimed is:

1. A method for producing a silicon material, the method comprising:
   (a) heating $CaSi_2$ powder in a range of 400 to 1000° C. to obtain $CaSi_2$ powder having a reduced distortion in crystals compared to the $CaSi_2$ powder prior to heating and a mean local misorientation of $CaSi_2$ crystals in a range of 0 to 0.7 degrees;
   (b) adding acid to the $CaSi_2$ powder obtained in step (a) to obtain a reaction mixture;
   (c) filtering, washing and drying the reaction mixture to obtain a layered silicon compound; and
   (d) heating the layered silicon compound at not less than 300° C. to obtain the silicon material.

2. The method for producing a silicon material according to claim 1, wherein the $CaSi_2$ powder used in step (a) is produced through grinding.

3. A method for producing a power storage device, the method comprising
   a step of producing a negative electrode using the silicon material produced by the production method according to claim 1.

* * * * *